United States Patent
Nakano et al.

(10) Patent No.: US 12,237,652 B2
(45) Date of Patent: Feb. 25, 2025

(54) SWITCH, GAS INSULATED SWITCHGEAR, AND METHOD FOR CONTROLLING SWITCH

(71) Applicant: Mitsubishi Electric Corporation, Tokyo (JP)

(72) Inventors: Mieko Nakano, Tokyo (JP); Shinichiro Nakauchi, Tokyo (JP); Yasunori Nakamura, Tokyo (JP); Takahiro Edo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 17/925,270

(22) PCT Filed: Jul. 6, 2020

(86) PCT No.: PCT/JP2020/026394
§ 371 (c)(1),
(2) Date: Nov. 14, 2022

(87) PCT Pub. No.: WO2022/009264
PCT Pub. Date: Jan. 13, 2022

(65) Prior Publication Data
US 2023/0238784 A1    Jul. 27, 2023

(51) Int. Cl.
*H02B 13/075* (2006.01)
*H01H 33/36* (2006.01)
(Continued)

(52) U.S. Cl.
CPC ........... *H02B 13/075* (2013.01); *H01H 33/36* (2013.01); *H01H 33/42* (2013.01); *H01H 33/91* (2013.01)

(58) Field of Classification Search
CPC ........ H01H 33/56; H01H 33/42; H01H 33/91; H01H 3/26; H01H 2003/266; H01H 11/0062; H01H 31/003; H02B 13/075
(Continued)

(56) References Cited

U.S. PATENT DOCUMENTS

| 4,843,292 A | * | 6/1989 | Ono | B25J 9/126 |
| | | | | 318/808 |
| 5,151,567 A | * | 9/1992 | Thuries | H01H 33/40 |
| | | | | 218/84 |

(Continued)

FOREIGN PATENT DOCUMENTS

| EP | 3451355 A1 | 3/2019 |
| GB | 2318913 A | 5/1998 |

(Continued)

OTHER PUBLICATIONS

International Search Report (PCT/ISA/210) with translation and Written Opinion (PCT/ISA/237) mailed on Sep. 24, 2020, by the Japan Patent Office as the International Searching Authority for International Application No. PCT/JP2020/026394. (11 pages).

(Continued)

*Primary Examiner* — William A Bolton
(74) *Attorney, Agent, or Firm* — BUCHANAN, INGERSOLL & ROONEY PC

(57) ABSTRACT

A switch includes a fixed contact, a movable contact, a motor to drive the movable contact via a drive mechanism that converts rotational motion into linear motion, and a drive controller to control driving of the motor. The drive controller controls a rotation speed of the motor such that during an opening operation of the switch, a moving speed of the movable contact in a part of an entire moving range of the movable contact is lower than a moving speed of the movable contact during a closing operation of the switch.

(Continued)

The part of the entire moving range includes an interrupting point at which an arc current is extinguished.

11 Claims, 12 Drawing Sheets

(51) Int. Cl.
  *H01H 33/42* (2006.01)
  *H01H 33/91* (2006.01)
(58) Field of Classification Search
  USPC ........ 218/12, 13, 56, 57, 59, 67, 68, 79, 80, 218/94, 100, 113
  See application file for complete search history.

(56) References Cited

U.S. PATENT DOCUMENTS

| | | | | |
|---|---|---|---|---|
| 6,713,984 | B1* | 3/2004 | Valdemarsson | H01H 33/36 318/560 |
| 7,151,353 | B2* | 12/2006 | Bosga | H01H 11/0062 318/563 |
| 9,177,741 | B2* | 11/2015 | Ghoreishi | H01H 33/36 |
| 9,530,578 | B2* | 12/2016 | Chen | H01H 3/3026 |
| 2007/0273461 | A1 | 11/2007 | Kang et al. | |
| 2015/0131207 | A1 | 5/2015 | Urai et al. | |
| 2019/0157017 | A1* | 5/2019 | Casado Cartón | H01H 3/32 |
| 2020/0203088 | A1* | 6/2020 | Marinkovic | H01H 3/30 |

FOREIGN PATENT DOCUMENTS

| | | | |
|---|---|---|---|
| JP | S5135713 | B1 | 10/1976 |
| JP | S62171412 | A | 7/1987 |
| JP | H04265692 | A | 9/1992 |
| JP | H08237829 | A | 9/1996 |
| JP | H09167549 | A | 6/1997 |
| JP | 2004088825 | A | 3/2004 |
| JP | 2007523475 | A | 8/2007 |
| JP | 2008229729 | A | 10/2008 |
| JP | 2012043664 | A | 3/2012 |
| JP | 2015069955 | A | 4/2015 |
| JP | 2015160072 | A | 9/2015 |
| WO | 2005078754 | A1 | 8/2005 |
| WO | 2013157360 | A1 | 10/2013 |

OTHER PUBLICATIONS

Office Action (Notice of Reasons for Refusal) with translation dated Apr. 6, 2021, issued in corresponding Japan Patent Application No. 2020-571743, 7 pages.

Extended European Search Report dated Aug. 23, 2023, issued in the corresponding European Patent Application No. 20944371.2, 9 pages.

* cited by examiner

FIG.2
(A)
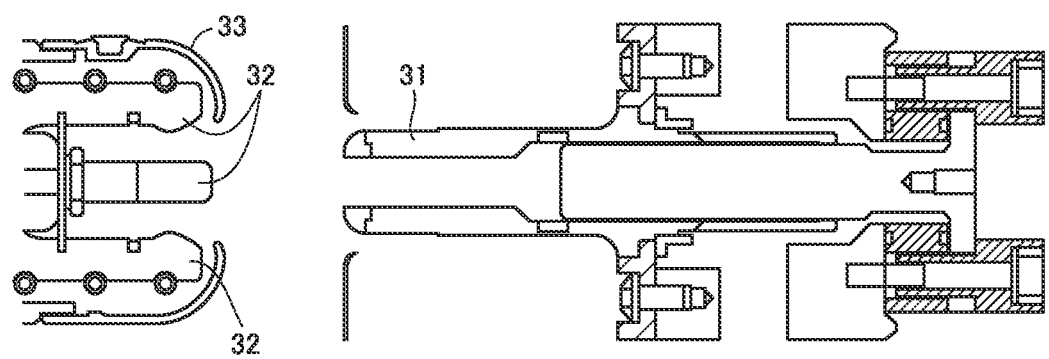
(B)
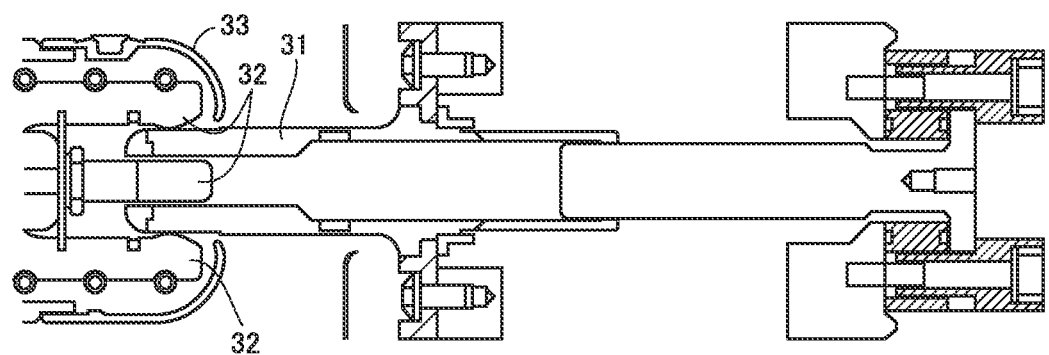

FIG.4
(A)
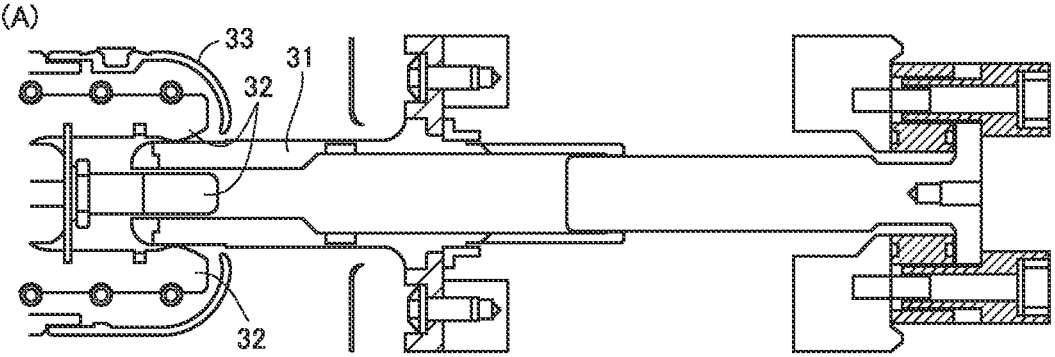
(B)
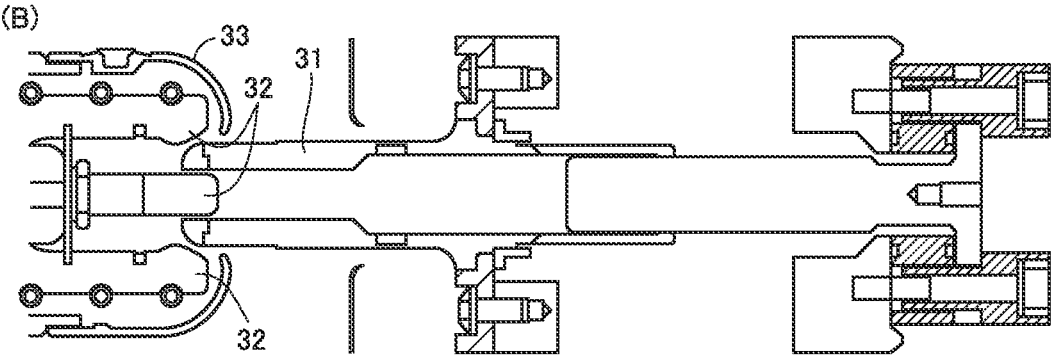
(C)
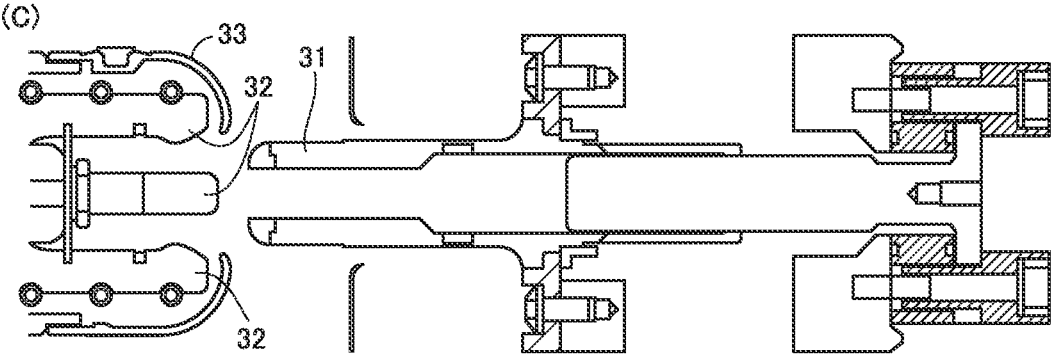
(D)
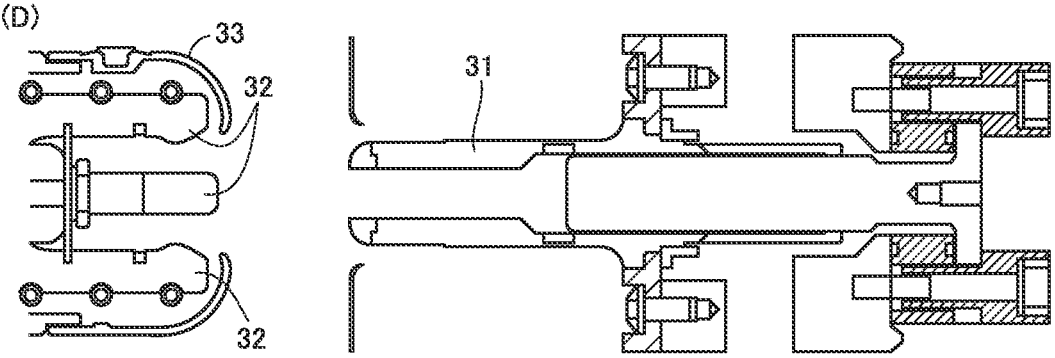

FIG.6
(A)
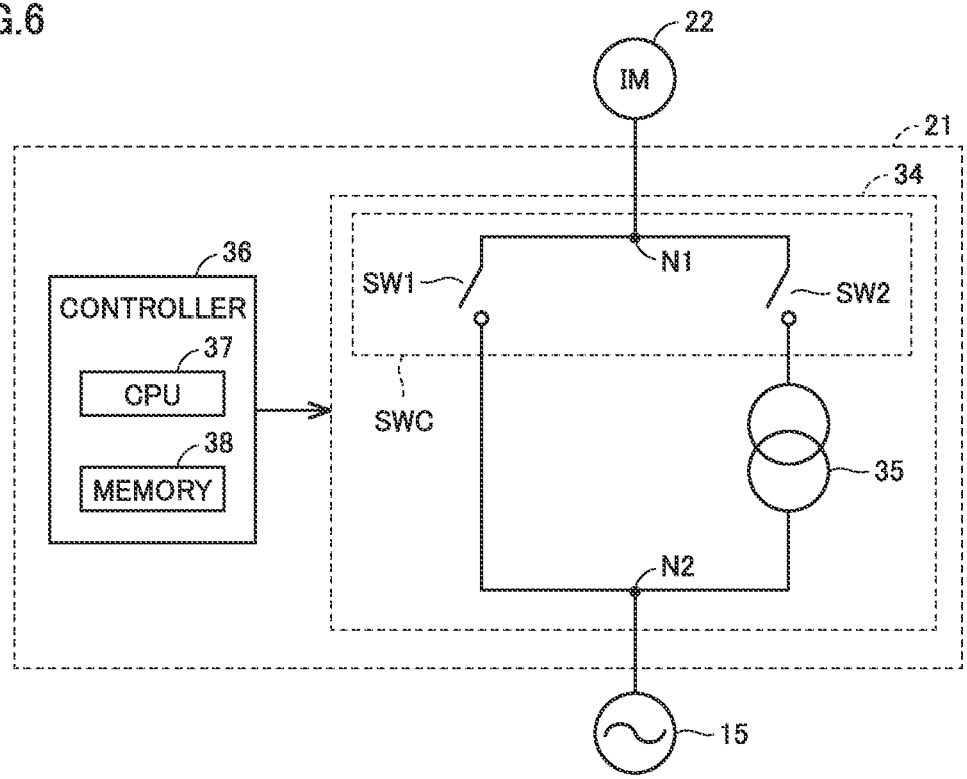
(B)
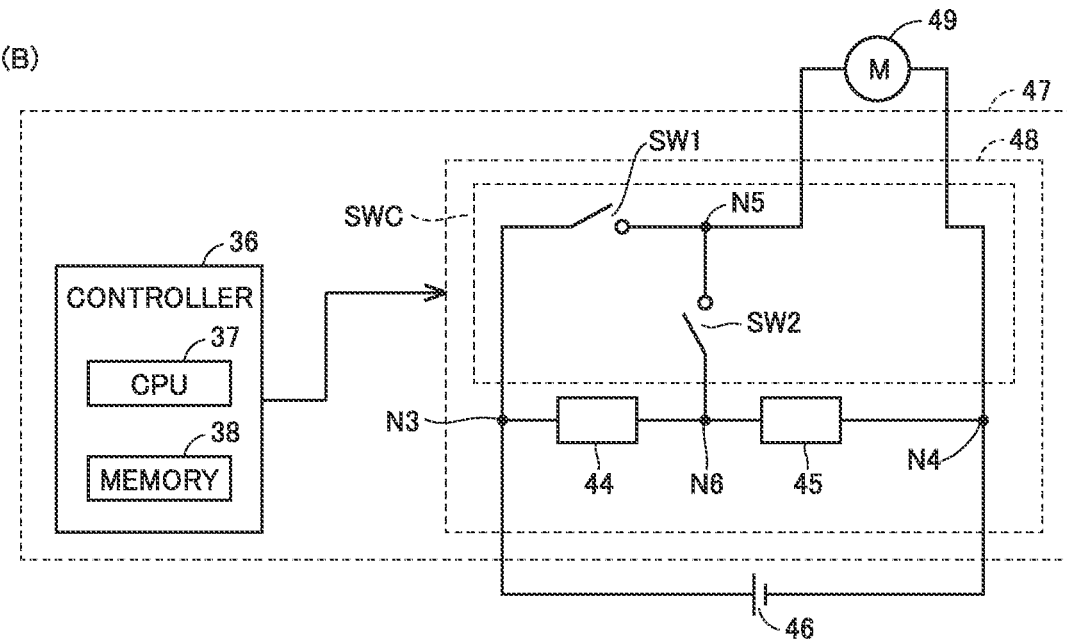

FIG.12
(A) ELECTROMAGNETIC INDUCTION
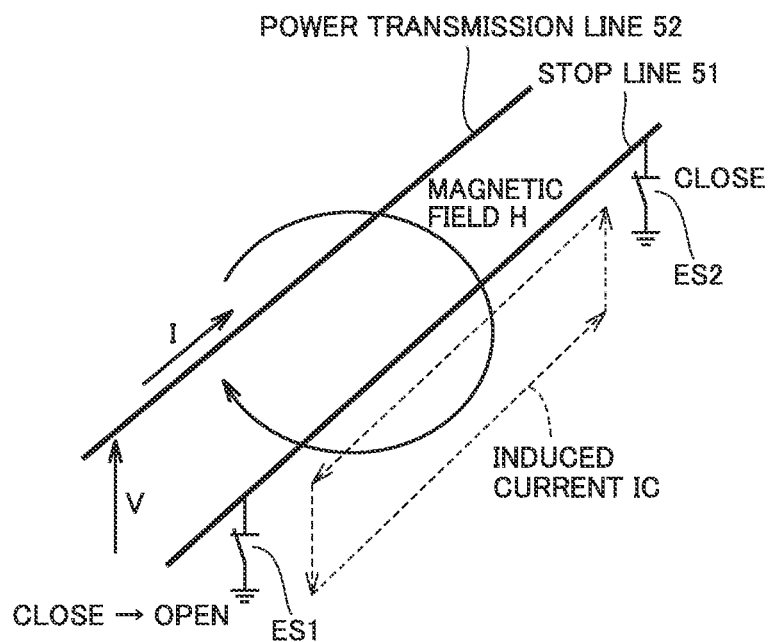
(B) ELECTROSTATIC INDUCTION
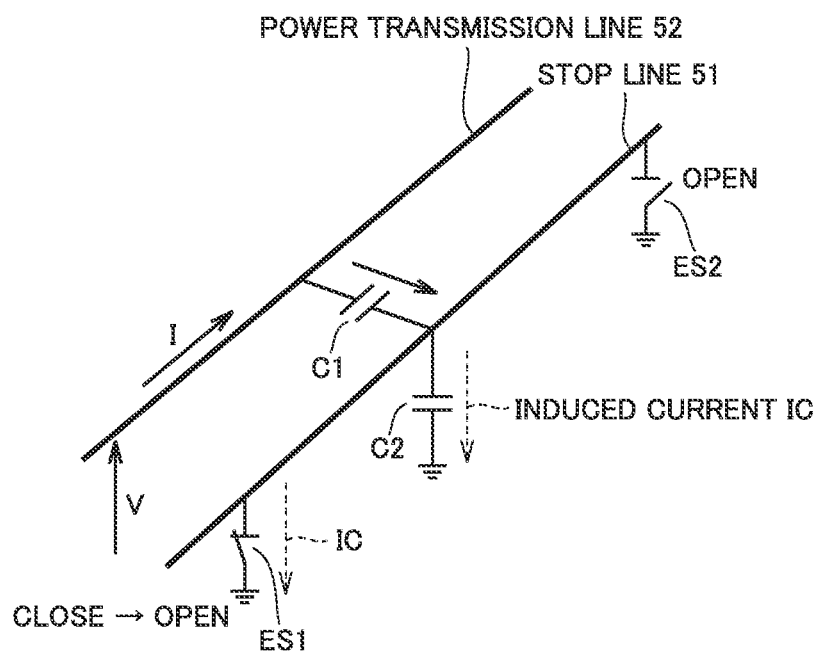

SWITCH, GAS INSULATED SWITCHGEAR, AND METHOD FOR CONTROLLING SWITCH

TECHNICAL FIELD

The present disclosure relates to a switch, a gas insulated switchgear, and a method for controlling the switch.

BACKGROUND ART

Japanese Patent Laying-Open No. 8-237829 (PTL 1) discloses a switch having a current interrupting capability of a constant voltage and small current. Specifically, according to this document, a movable contact as a whole is driven by an electric motor controlled by a pole number conversion device or a frequency conversion device in order to increase an opening speed of the contact. Further, the movable contact is accelerated upon opening by a compression spring attached to the movable contact. As a result, the opening speed of the movable arcing contact immediately after opening becomes a maximum speed having a peak (see paragraph [0004]).

CITATION LIST

Patent Literature

PTL 1: Japanese Patent Laying-Open No. 8-237829

SUMMARY OF INVENTION

Technical Problem

In recent years, reduction of a device size of a gas insulation device has been studied, and adoption of a gas having low arc-extinguishing performance has been studied as an alternative gas for $SF_6$ gas. In these cases, if the conventional method for driving a movable contact is applied, there arises a problem that a distance between contacts required for current interruption is insufficient, and sufficient current interrupting performance cannot be obtained.

The present disclosure has been made in view of the above problems, and one object of the present disclosure is to provide a motor-driven switch having sufficient current interrupting capability.

Solution to Problem

A switch according to an embodiment includes a fixed contact, a movable contact, a motor to drive the movable contact via a drive mechanism that converts rotational motion into linear motion, and a drive controller to control driving of the motor. The drive controller controls a rotation speed of the motor such that during an opening operation of the switch, a moving speed of the movable contact in a part of an entire moving range of the movable contact is lower than a moving speed of the movable contact during a closing operation of the switch. The part of the entire moving range includes an interrupting point at which an arc current is extinguished.

Advantageous Effects of Invention

According to the above embodiment, the rotation speed of the motor is controlled such that during the opening opera-tion of the switch, the moving speed of the movable contact in the part of the entire moving range of the movable contact becomes low. Therefore, it is possible to provide a motor-driven switch having sufficient current interrupting capability.

BRIEF DESCRIPTION OF DRAWINGS

FIG. 2 is a cross-sectional view for illustration of a closing operation of the switch according to a first embodiment.

FIG. 4 is a cross-sectional view for illustration of an opening operation of the switch according to the first embodiment.

FIG. 6 is a block diagram illustrating an example of a configuration of a drive controller operated by an AC power supply or a DC power supply in the switch according to a second embodiment.

FIG. 12 is a diagram for illustration of an induced current interrupting duty of an earth switch.

DESCRIPTION OF EMBODIMENTS

Hereinafter, embodiments will be described in detail with reference to the drawings. The same or corresponding parts are denoted by the same reference signs, and descriptions thereof will not be repeated.

First Embodiment

Overall Configuration of Switch

Figure 1:
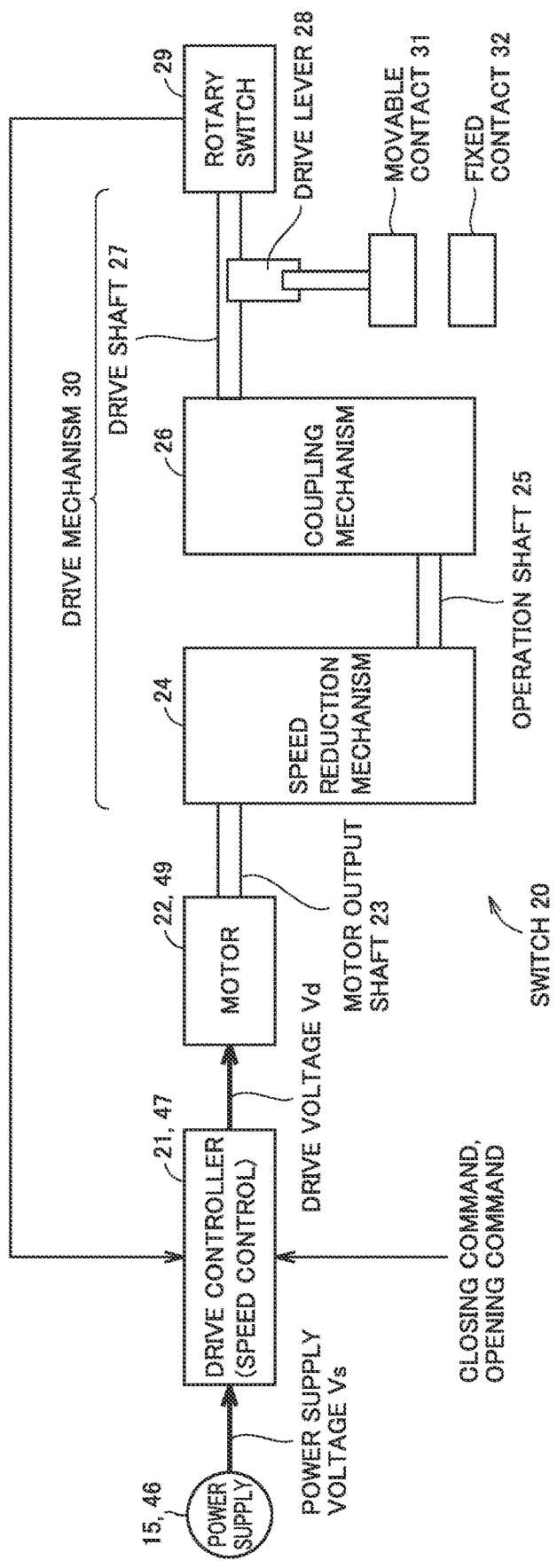
FIG. 1 is a block diagram illustrating an example of an overall configuration of a motor-driven switch.

FIG. 1 is a block diagram illustrating an example of an overall configuration of a motor-driven switch. A switch 20 includes a motor 22, a drive controller 21, a drive mechanism 30, a movable contact 31, a fixed contact 32, and a rotary switch 29. Motor 22 and drive controller 21 are operated by an AC power supply 15. Instead of motor 22 and drive controller 21, a motor 49 and a drive controller 47 operated by a DC power supply 46 can also be used.

Each of motors 22 and 49 drives movable contact 31 via drive mechanism 30. As motor 22, for example, an induction electric motor or an AC-driven AC commutator motor (also referred to as a universal motor). A DC-driven universal motor can be used as motor 49. In motor 22, a rotation speed can be controlled by controlling an AC drive voltage Vd applied to a stator winding. In the case of an induction electric motor, speed control can also be performed using conversion of the number of poles, secondary resistance control, primary frequency control, and the like. Similarly, a rotation speed of motor 49 can be controlled by controlling a DC driving voltage Vd. Note that other types of motors can be used as long as speed control is possible and sufficient torque can be obtained immediately after activation.

Drive controllers 21 and 47 drive and control motors 22 and 49, respectively, in accordance with a closing command and an opening command received from a high-order controller (not illustrated) to close and open switch 20. In particular, drive controllers 21 and 47 change the rotation speeds of motors 22 and 49, respectively, based on position information of movable contact 31 received from rotary switch 29 during an opening operation. Furthermore, rotation directions of motors 22 and 49 can be changed by control of drive controllers 21 and 47, respectively. Drive controller 21 operates based on an AC power supply voltage Vs supplied from AC power supply 15. Drive controller 47 operates based on a DC power supply voltage Vs supplied from DC power supply 46.

Drive mechanism 30 converts a rotational motion of a motor output shaft 23 into a linear motion of movable contact 31. As illustrated in FIG. 1, as one example, drive mechanism 30 includes a speed reduction mechanism 24 and a coupling mechanism 26.

Speed reduction mechanism 24 converts the rotational motion of motor output shaft 23 into a rotational motion of an operation shaft 25 of a lower speed. As speed reduction mechanism 24, for example, a gear reducer can be used.

Coupling mechanism 26 transmits the rotational motion of operation shaft 25 to a rotational motion of a drive shaft 27 and a drive lever 28 fixed to drive shaft 27. The rotational motion of drive lever 28 is converted into the linear motion of movable contact 31 by a slider crank mechanism (not illustrated) or the like.

Rotary switch 29 detects that drive shaft 27 has rotated by a predetermined angle. As a result, it is possible to detect that movable contact 31 has reached a predetermined position. A detection signal of rotary switch 29 is transmitted to drive controller 21 or 47. Rotary switch 29 may be attached to operation shaft 25 or motor output shaft 23 instead of drive shaft 27.

Closing Operation of Switch

FIG. 2 is a cross-sectional view for illustration of a closing operation of the switch according to a first embodiment. The closing operation is also referred to as a turn-on operation. At the time of the closing operation, motor 22 and 49 are controlled to rotate at a rated rotation speed in order to suppress wear of the contact.

FIG. 2(A) illustrates a state at the start of the closing operation. Movable contact 31 is positioned at a large distance from fixed contact 32. Fixed contact 32 is disposed in a shield 33.

FIG. 2(B) illustrates a state at the time of completion of the closing operation. A convex portion of movable contact 31 is fitted into a concave portion of fixed contact 32, and a convex portion of fixed contact 32 is fitted into a concave portion of movable contact 31, whereby movable contact 31 and fixed contact 32 are coupled.

Figure 3:
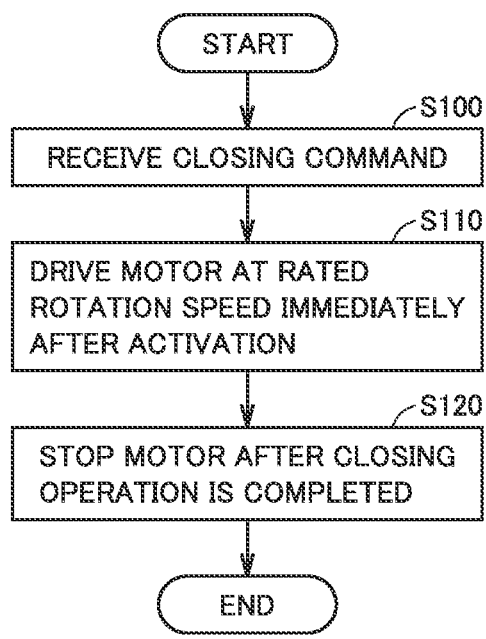
FIG. 3 is a flowchart showing an operation of a drive controller during the closing operation of the switch according to the first embodiment.

FIG. 3 is a flowchart showing an operation of a drive controller during the closing operation of the switch according to the first embodiment. In the following description, a case where motor 22 and drive controller 21 operating on AC power supply 15 are used will be described, but the same applies to a case where motor 49 and drive controller 47 operating on DC power supply 46 are used, instead of motor 22 and drive controller 21.

Referring to FIG. 3, in step S100, drive controller 21 receives a closing command of switch 20.

In subsequent step S110, drive controller 21 activates motor 22, and controls motor 22 so that motor output shaft 23 rotates at the rated rotation speed immediately after the activation.

In further subsequent step S120, drive controller 21 stops motor 22 when it is detected based on a signal from rotary switch 29 that movable contact 31 has reached a completion position of the closing operation.

Opening Operation of Switch

During the opening operation, it is necessary to completely extinguish the arc at a current zero point of an AC arc current flowing between movable contact 31 and fixed contact 32. When the rotation speed of motor 22 and 49 are controlled to the rated rotation speed that is the same as that of the closing operation, an interrupting position varies. Therefore, it is necessary to reduce variation in the interrupting position and to secure sufficient time for the current zero point. For this purpose, drive controllers 21 and 47 respectively drive motors 22 and 49 at a low rotation speed during the opening operation, and thus, the moving speed of movable contact 31 is reduced. Hereinafter, a specific description will be given with reference to FIG. 4. In the following description, a case where motor 22 and drive controller 21 operating on AC power supply 15 are used will be described, but the same applies to a case where motor 49 and drive controller 47 operating on DC power supply 46 are used, instead of motor 22 and drive controller 21.

FIG. 4 is a cross-sectional view for illustration of an opening operation of the switch according to the first embodiment. The opening operation is also referred to as a turn-off operation.

FIG. 4(A) illustrates a state at the start of the opening operation. The state illustrated in FIG. 4(A) corresponds to the state at the time of completion of the closing operation illustrated in FIG. 2(B).

FIG. 4(B) illustrates a state in which a tip part of movable contact 31 has reached a separation point (first point) where the tip part has just separated from fixed contact 32. From the start of the opening operation until the tip part of movable contact 31 reaches the opening point, drive controller 21 controls motor 22 to rotate at the rated rotation speed that is the same as that during the closing operation. As a result, movable contact 31 is driven at the rated speed.

FIG. 4(C) illustrates a state in which the tip part of movable contact 31 reaches the vicinity of an interrupting point where the arc is extinguished. Drive controller 21 controls motor 22 to rotate at a low rotation speed after the tip part of movable contact 31 passes through the separation point (first point) until the tip part reaches a second point. As a result, movable contact 31 is driven at a low speed. The second point is in the vicinity of the interrupting point of switch 20, and the interrupting point is located between the first point and the second point. The low rotation speed of motor 22 is, for example, about 50% to 70% of the rated rotation speed.

FIG. 4(D) illustrates a state at the completion of the opening operation. After movable contact 31 passes through the interrupting point until the opening operation is completed, drive controller 21 operates motor 22 at the rated rotation speed that is the same as that during the closing operation. As a result, movable contact 31 is driven at the rated speed.

Figure 5:
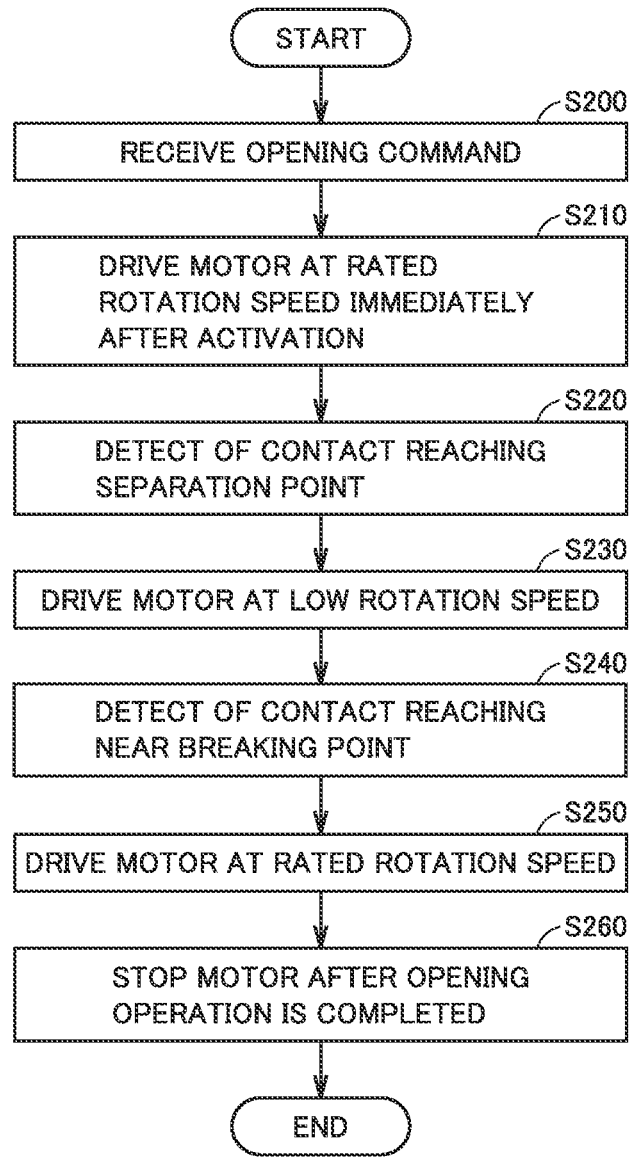
FIG. 5 is a flowchart showing the operation of the drive controller during the opening operation of the switch according to the first embodiment.

FIG. 5 is a flowchart showing the operation of the drive controller during the opening operation of the switch according to the first embodiment. In the following description, a case where motor 22 and drive controller 21 operating on AC power supply 15 are used will be described, but the same applies to a case where motor 49 and drive controller 47 operating on DC power supply 46 are used, instead of motor 22 and drive controller 21.

Referring to FIG. 5, in step S200, drive controller 21 receives an opening command of switch 20.

In subsequent step S210, drive controller 21 activates motor 22, and controls motor 22 so that motor output shaft 23 rotates at the rated rotation speed (first rotation speed) immediately after the activation.

In subsequent step S220, drive controller 21 detects, on the basis of a signal from rotary switch 29, that the tip part of movable contact 31 has reached the separation point (first point).

In subsequent step S230, drive controller 21 controls motor 22 to rotate at a rotation speed (second rotation speed) lower than the rated rotation speed. The second rotation speed is, for example, about 50% to 70% of the first rotation speed, but is not limited to this numerical value.

In subsequent step S240, drive controller 21 detects, based on a signal from rotary switch 29, that the tip part of movable contact 31 reaches the second point near the interrupting point. The interrupting point at which the arc current is extinguished exists between the first point and the second point.

In subsequent step S250, drive controller 21 controls motor 22 to rotate at the rated rotation speed (more generally, a third rotation speed that is higher than the second rotation speed).

In further subsequent step S260, drive controller 21 stops motor 22 when it is detected based on a signal from rotary switch 29 that movable contact 31 has reached a completion position of the opening operation.

To summarize the above, drive controller 21 controls the rotation speed of motor 22 such that the moving speed of movable contact 31 in the part of the entire moving range of movable contact 31 in the opening operation (that is, between the first point and the second point) is lower than that in the closing operation. Furthermore, drive controller 21 controls the rotation speed of motor 22 such that the moving speed of movable contact 31 in the part of the entire moving range of movable contact 31 in the opening operation (that is, between the first point and the second point) is lower than the moving speed of movable contact 31 in the other part of the entire moving range.

Effects of First Embodiment

As described above, according to switch 20 of the first embodiment, drive controllers 21 and 47 respectively control the rotation speeds of motors 22 and 49 such that during the opening operation, movable contact 31 moves in the vicinity of the interrupting point where the arc current is extinguished at a lower speed than that during the closing operation. It is thereby possible to suppress variation in the interrupting position and reliably interrupt the arc current. As a result, it is possible to provide a switch having sufficient current interrupting performance even when the maximum separation distance between movable contact 31 and fixed contact 32 is further reduced to reduce the device size.

Second Embodiment

In a second embodiment, specific examples of configurations of drive controllers 21 and 47 will be described. An induction motor is used as motor 22, and a universal motor is used as motor 49. As motor 22, a universal motor may be used instead of an induction motor.

FIG. 6 is a block diagram illustrating an example of a configuration of a drive controller operated by an AC power supply or a DC power supply in the switch according to the second embodiment. FIG. 6(A) illustrates an example of a configuration of drive controller 21 operated by AC power supply 15, and FIG. 6(B) illustrates an example of a configuration of drive controller 47 operated by DC power supply 46. For simplicity, FIG. 6(A) shows an outgoing line and a returning line of a current flowing through a single-phase AC circuit are collectively represented by a single line.

Configuration of Drive Controller 21

Referring to FIG. 6(A), drive controller 21 includes a drive circuit 34 that drives motor 22 and a controller 36 that controls drive circuit 34.

Drive circuit 34 includes a switching circuit SWC and a transformer 35. As an example, switching circuit SWC includes a first switch SW1 connected between a first node N1 and a second node N2, and a second switch SW2 connected in parallel with first switch SW1 and in series with transformer 35. First node N1 is connected to the stator winding of motor 22, and second node N2 is connected to AC power supply 15. Transformer 35 outputs a step-down voltage obtained by converting a power supply voltage of AC power supply 15 supplied to the primary side into a low voltage from the secondary side. A transformer ratio of transformer 35 is set to 0.5, for example, but is not limited to this value. According to the above configuration, switching circuit SWC can switch between direct connection of AC power supply 15 to the stator winding of motor 22 and connection of AC power supply 15 to the stator winding of motor 22 via transformer 35.

As illustrated in FIG. 6(A), controller 36 is configured based on a computer including a CPU 37 and a memory 38 as an example. CPU 37 controls opening and closing operations of switches SW1 and SW2 by executing a program stored in memory 38. The program may be provided by a storage medium that non-transiently stores the program by magnetic or optical means, or may be provided via a network. Note that the function of controller 36 may be realized by an electronic circuit such as an application specific integrated circuit (ASIC) or a field programmable gate array (FPGA).

When motor 22 is rotated at the rated rotation speed, controller 36 turns on switch SW1 and turns off switch SW2. As a result, since AC power supply 15 is directly connected to motor 22, motor 22 is driven by the power supply voltage of AC power supply 15.

On the other hand, when motor 22 is rotated at a low rotation speed, controller 36 turns off switch SW1 and turns on switch SW2. As a result, since AC power supply 15 is connected to motor 22 via transformer 35, a step-down voltage obtained by converting the power supply voltage of AC power supply 15 into a low voltage by transformer 35 is supplied to motor 22. As a result, the rotation speed of motor 22 can be reduced as compared with a case where the power supply voltage of AC power supply 15 is directly supplied to motor 22.

Configuration of Drive Controller 47

Referring to FIG. 6(B), drive controller 47 includes a drive circuit 48 that drives motor 49 and controller 36 that controls drive circuit 48.

Drive circuit 48 includes switching circuit SWC, a resistor 44, and a voltage dividing resistor 45. As an example, switching circuit SWC includes first switch SW1 connected in series with motor 49 between a first node N3 and a second node N4, and resistor 44 and voltage dividing resistor 45 connected in series with each other and in parallel with a combination of motor 49 and first switch SW1. Drive circuit 48 further includes switch SW2. Switch SW2 connects a node N5 between switch SW1 and motor 49 and a node N6 between resistor 44 and voltage dividing resistor 45. DC power supply 46 is connected between node N3 and node N4. According to the above configuration, switching circuit SWC can switch between direct connection of DC power supply 46 to motor 49 and connection of DC power supply 46 to motor 49 via resistor 44.

When motor 49 is rotated at the rated rotation speed, controller 36 turns on switch SW1 and turns off switch SW2. In this case, motor 49 is directly connected to DC power supply 46. Therefore, motor 49 is supplied with a voltage equal to the voltage applied to a combination of resistor 44 and voltage dividing resistor 45, that is, the power supply voltage of DC power supply 46.

On the other hand, when motor 49 is rotated at a low rotation speed, controller 36 turns off switch SW1 and turns on switch SW2. In this case, an output voltage of DC power supply 46 is divided by resistor 44 and voltage dividing resistor 45. Therefore, motor 49 is connected to DC power supply 46 via resistor 44, and the voltage applied to voltage dividing resistor 45 is supplied to motor 49.

Figure 7:
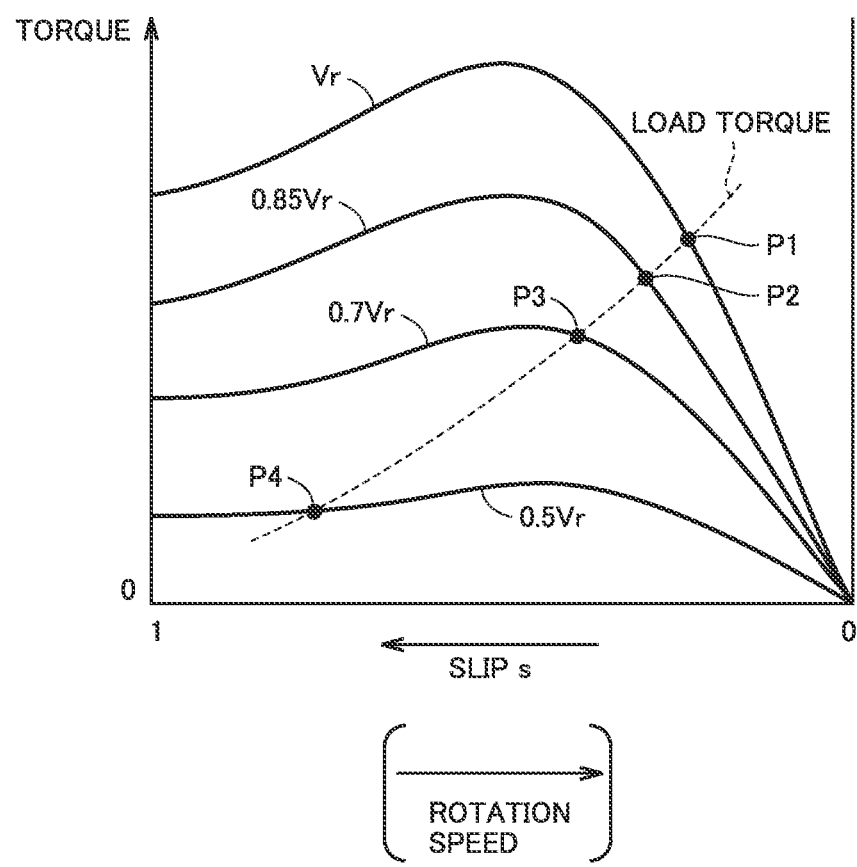
FIG. 7 is a diagram illustrating an example of speed-torque characteristics of an induction motor.

Hereinafter, the principle of speed control of the induction motor by voltage control will be briefly described. FIG. 7 is a diagram illustrating an example of speed-torque characteristics of an induction motor.

FIG. 7 illustrates output torque curves representing relationship between torque T and the slip s in the induction motor in the case where the voltage applied to the stator winding is a rated voltage Vr and in the case where the voltages applied to the stator winding are 0.85 Vr, 0.7 Vr, and 0.5 Vr that are smaller than the rated voltage. The rotation speed of a rotor is equal to (1−s) times of the synchronous speed.

The actual rotation speed of the rotor is determined by an intersection of the output torque curve and the load torque curve. As illustrated in FIG. 7, in the case of the induction motor that drives movable contact 31, the load torque decreases as the rotation speed decreases. Therefore, as the applied voltage of the stator winding decreases from the rated voltage Vr to 0.85 Vr, 0.7 Vr, and 0.5 Vr, the operating point of motor 22 changes toward the low rotation speed in the order of P1, P2, P3, and P4. As a result, the rotation speed of motor 22 can be controlled by the voltage applied to the stator winding.

Operation of Drive Controller

Next, a control operation of drive circuit 34 by controller 36 constituting drive controller 21 and a control operation of drive circuit 48 by controller 36 constituting drive controller 47 will be described. Since the control operation in the case of drive controller 21 is similar to the control operation in the case of drive controller 47, the latter case will be described in parentheses in the following description.

Figure 8:
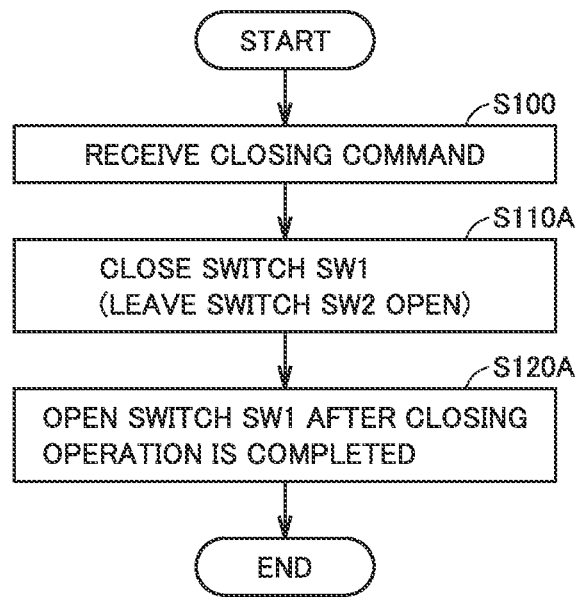
FIG. 8 is a flowchart showing an operation of a drive controller during the closing operation of the switch according to the second embodiment.

FIG. 8 is a flowchart showing an operation of a drive controller during the closing operation of the switch according to the second embodiment. In the flowchart of FIG. 8, steps corresponding the steps in the flowchart of FIG. 3 are denoted by the same or similar reference numerals.

Referring to FIG. 8, in the initial state, both switches SW1 and SW2 are in the open state. In step S100, controller 36 receives a closing command of switch 20.

In subsequent step S110A, controller 36 closes switch SW1 of drive circuit 34 (48). As a result, motor 22 (49) is activated, and rotates in a first direction at the rated rotation speed immediately after the activation.

In subsequent step S120A, controller 36 opens switch SW1, when it is detected based on a signal from rotary switch 29 that movable contact 31 has reached a completion position of the closing operation. As a result, motor 22 (49) is stopped.

Figure 9:
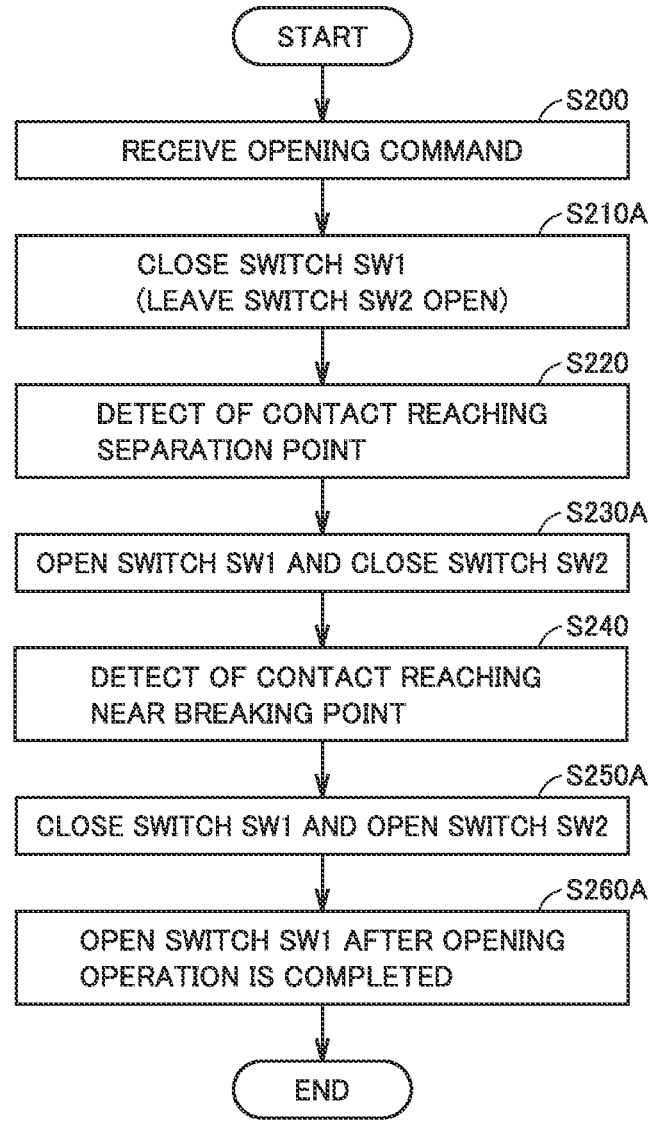
FIG. 9 is a flowchart showing the operation of the drive controller during the opening operation of the switch according to the second embodiment.

FIG. 9 is a flowchart showing the operation of the drive controller during the opening operation of the switch according to the second embodiment. In the flowchart of FIG. 9, steps corresponding the steps in the flowchart of FIG. 5 are denoted by the same or similar reference numerals. Since the control operation in the case of drive controller 21 is similar to the control operation in the case of drive controller 47, the latter case will be described in parentheses in the following description.

Referring to FIG. 9, in the initial state, both switches SW1 and SW2 are in the open state. In step S200, controller 36 receives an opening command of switch 20. Controller 36 switches the connection between drive circuit 34 (48) and the stator winding of motor 22 (49) so as to have an opposite polarity to that in the closing operation.

In subsequent step S210A, controller 36 closes switch SW1 of drive circuit 34 (48). As a result, since the rated voltage is applied to the stator winding of motor 22 (49), motor 22 (49) is activated. Then, motor 22 (49) rotates in a second direction opposite to the first direction at the rated rotation speed, that is, the first rotation speed, immediately after the activation.

In subsequent step S220, controller 36 detects, on the basis of a signal from rotary switch 29, that the tip part of movable contact 31 has reached the separation point, that is, the first point.

In subsequent step S230A, controller 36 opens switch SW1 of drive circuit 34 (48) and closes switch SW2 of drive circuit 34 (48). As a result, since a step-down voltage lower than the rated voltage is applied to the stator winding of motor 22 (49), motor 22 (49) rotates at a rotation speed lower than the rated rotation speed, that is, at the second rotation speed. The second rotation speed is about 50% to 70% of the first rotation speed, for example, but is not limited to this numerical value.

In subsequent step S240, controller 36 detects, based on a signal from rotary switch 29, that the tip part of movable contact 31 reaches the second point near the interrupting point. The interrupting point at which the arc current is extinguished exists between the first point and the second point.

In subsequent step S250A, controller 36 opens switch SW2 of drive circuit 34 (48) and closes switch SW1 of drive circuit 34 (48). As a result, since the rated voltage is applied to the stator winding of motor 22 (49), motor 22 (49) rotates at the rated rotation speed. More generally, motor 22 (49) rotates at the third rotation speed that is higher than the second rotation speed.

In subsequent step S260A, controller 36 opens switch SW1, when it is detected based on a signal from rotary switch 29 that movable contact 31 has reached a completion position of the opening operation. As a result, motor 22 (49) is stopped.

Effects of Second Embodiment

As described above, according to the switch of the second embodiment, the speed control of motor 22 for driving movable contact 31 can be realized by a simple method of controlling an AC voltage applied to the stator winding of the induction motor or the universal motor using the transformer, when the AC voltage is supplied from AC power supply 15. In addition, the speed control of motor 49 for driving movable contact 31 can be realized by a simple method of controlling a DC voltage supplied to the universal motor using resistor 44 and voltage dividing resistor 45, when the DC voltage is supplied from DC power supply 46. As a result, as in the case of the first embodiment, it is possible to provide a switch having sufficient current interrupting performance.

Third Embodiment

In a third embodiment, an example in which the switch described in the first and second embodiments is used as an earth switch of a gas insulated switchgear will be described.

Configuration of Gas Insulated Switchgear

Figure 10:
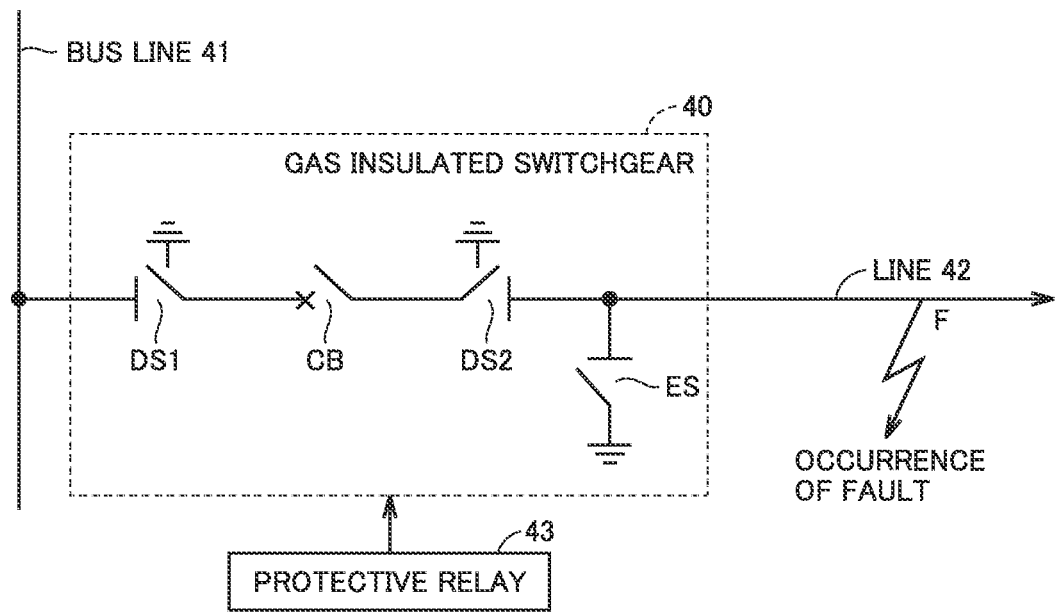
FIG. 10 is a connection wiring diagram illustrating a configuration of a gas insulated switchgear.

FIG. 10 is a connection wiring diagram illustrating a configuration of a gas insulated switchgear. Referring to FIG. 10, a gas insulated switchgear 40 is provided on a line 42 (load side) drawn out from a bus line 41 (power supply side).

Gas insulated switchgear 40 includes a circuit breaker CB, disconnectors DS1 and DS2 each with a grounding electrode, and an earth switch ES. These components are installed in a metal container (not illustrated) in which an insulating gas is enclosed.

As illustrated in FIG. 10, disconnector DS1 is provided on line 42 between circuit breaker CB and bus line 41. Disconnector DS2 is provided on line 42 opposite to bus line 41 with respect to circuit breaker CB. Earth switch ES is connected between a connection point on line 42, the connection point being opposite to bus line 41 with respect to disconnector DS2, and the grounding pole.

Operation of Gas Insulated Switchgear

Figure 11:
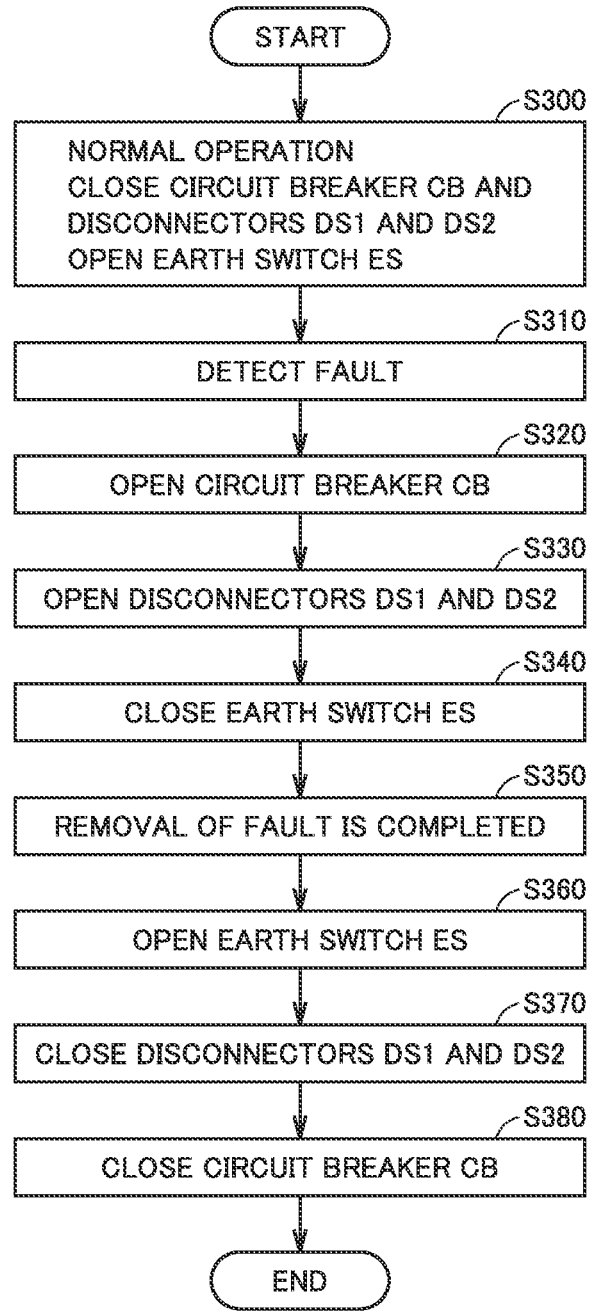
FIG. 11 is a flowchart showing an operation of the gas insulated switchgear at the time of a fault of a power transmission line.

FIG. 11 is a flowchart showing an operation of the gas insulated switchgear at the time of a fault of a power transmission line. Gas insulated switchgear 40 operates in accordance with a control command from a protective relay 43.

Step S300 shows an operation at a normal time. Protective relay 43 controls circuit breaker CB and disconnectors DS1 and DS2 to be in the closed state, and controls earth switch ES to be in the open state.

Next, in step S310, protective relay 43 detects that a fault has occurred at a fault point F on line 42. Based on the fault detection, protective relay 43 opens circuit breaker CB in step S320. As a result, the power transmission is stopped, and the arc at fault point F disappears.

Further, in subsequent step S330, protective relay 43 opens disconnectors DS1 and DS2. Further, in subsequent step S340, protective relay 43 closes earth switch ES. As a result, circuit breaker CB and line 42 become zero voltage.

Upon completion of removal of the fault (step S350), in step S360, protective relay 43 opens earth switch ES. Further, in subsequent step S370, protective relay 43 closes disconnectors DS1 and DS2. Further, in subsequent step S380, protective relay 43 closes circuit breaker CB. As a result, power transmission is resumed.

Effects of Third Embodiment

The earth switch constituting the gas insulated switchgear needs to satisfy an induced current interrupting duty. Hereinafter, the induced current interrupting duty will be briefly described. In the following description, an example in which, in parallel double-circuit transmission, a stop line 51 is affected by electromagnetic induction and electrostatic induction from a power transmission line 52 in normal operation will be described. Note that, in a three-phase power transmission line, a case where the power transmission line of a faulty phase is affected by electromagnetic induction and electrostatic induction from the power transmission line of a sound phase can be similarly considered.

FIG. 12 is a diagram for illustration of an induced current interrupting duty of an earth switch. FIG. 12(A) illustrates a case where an induced current IC flows to an earth switch ES1 by electromagnetic induction, and FIG. 12(B) illustrates a case where induced current IC flows to earth switch ES1 by electrostatic induction.

Referring to FIG. 12(A), when earth switches ES1 and ES2 at both ends of stop line 51 are in the closed state, stop line 51, earth switches ES1 and ES2, and the ground constitute a closed circuit. Therefore, induced current IC flows through the closed circuit, which is caused by a magnetic field H generated by the current flowing through power transmission line 52. Therefore, when earth switch ES1 is switched from the closed state to the open state, earth switch ES1 needs to reliably interrupt induced current IC due to the electromagnetic induction.

Referring to FIG. 12(B), when earth switch ES1 on one end side of stop line 51 is in the closed state and an earth switch ES2 on the other end side of stop line 51 is in the open state, the closed circuit is not provided between stop line 51 and the ground. In this case, stop line 51 is affected by the electrostatic induction from power transmission line 52 through electrostatic capacitance C1. As a result, induced current IC flows from stop line 51 to the ground via an electrostatic capacitance C2. Therefore, when earth switch ES1 is switched from the closed state to the open state, earth switch ES1 needs to reliably interrupt induced current IC due to the electrostatic induction.

Here, by using switch 20 described in the first embodiment and the second embodiment as earth switch ES in gas insulated switchgear 40 of the third embodiment, sufficient current interrupting performance can be realized. Therefore, it is possible to provide an earth switch that reliably satisfies the dielectric current interrupting duty.

The embodiments disclosed herein should be considered to be illustrative in all respects and not restrictive. The scope of the present application is defined by the claims, instead of the descriptions stated above, and it is intended that meanings equivalent to the claims and all modifications within the scope are included.

REFERENCE SIGNS LIST

15: AC power supply, 20: switch, 21, 47: drive controller, 22, 49: motor, 23: motor output shaft, 29: rotary switch, 30: drive mechanism, 31: movable contact, 32: fixed contact, 34, 48: drive circuit, 35: transformer, 36: controller, 37: CPU 38: memory, 40: gas insulated switchgear, 41: bus line, 42: line, 43: protective relay, 46: DC power supply, CB: circuit breaker, DS1, DS2: disconnector, ES: earth switch, N1: first node, N2: second node, SW1, SW2: switch, SWC: switching circuit

The invention claimed is:

1. A switch comprising:
a fixed contact;
a movable contact that is couplable to the fixed contact to complete a closing operation of the switch;
a motor to drive the movable contact via a drive mechanism that converts rotational motion into linear motion of the movable contact; and
a drive controller to drive and control the motor, wherein
the drive controller controls a rotation speed of the motor such that during an opening operation of the switch, a moving speed of the movable contact in a part of an entire moving range of the movable contact is lower than a moving speed of the movable contact during the closing operation of the switch from start to completion of the closing operation,
an interrupting point at which an arc current flowing between the movable contact and the fixed contact is extinguished is located in the part of the entire moving range,
a tip part of the movable contact is engaged with the fixed contact at start of the opening operation,
the drive controller controls the motor such that the motor rotates at a first rotation speed from start of the opening operation until the tip part of the movable contact reaches a first position at which the tip part has just separated from the fixed contact,
the drive controller controls the motor such that the motor rotates at a second rotation speed lower than the first rotation speed after the tip part of the movable contact passes through the first position until the tip part reaches a second position,
the interrupting point is located between the first position and the second position, and the part of the entire moving range of the movable contact is defined between the first position and the second position, and
the drive controller controls the motor such that the motor rotates at a third rotation speed higher than the second rotation speed after the tip part of the movable contact passes through the second position until the opening operation is completed.

2. The switch according to claim 1, wherein
the drive controller controls the motor such that the first rotation speed and the third rotation speed are equal to a rotation speed of the motor during the closing operation of the switch.

3. The switch according to claim 1, wherein
the motor is one of an induction motor and a universal motor, and
the drive controller includes:
a transformer to step down an input AC voltage;
a switching circuit to switch between direct connection of an AC power supply to the motor and connection of the AC power supply to the motor via the transformer; and
a controller to control a switching operation of the switching circuit.

4. The switch according to claim 3, wherein
the controller controls the switching circuit to directly connect the AC power supply to the motor from start of the opening operation until the tip part of the movable contact reaches the first position,
the controller controls the switching circuit to connect the AC power supply to the motor via the transformer after the tip part of the movable contact passes through the first position until the tip part reaches the second position, and
the controller controls the switching circuit to directly connect the AC power supply to the motor after the tip part of the movable contact passes through the second position until the opening operation is completed.

5. The switch according to claim 1, wherein
the motor is a universal motor, and
the drive controller includes:
a resistor to divide a DC voltage that is input to the resistor;
a switching circuit to switch between direct connection of an DC power supply to the motor and connection of the DC power supply to the motor via the resistor; and
a controller to control a switching operation of the switching circuit.

6. The switch according to claim 5, wherein
the controller controls the switching circuit to directly connect the DC power supply to the motor from start of the opening operation until the tip part of the movable contact reaches the first position,
the controller controls the switching circuit to connect the DC power supply to the motor via the resistor after the tip part of the movable contact passes through the first position until the tip part reaches the second position, and
the controller controls the switching circuit to directly connect the DC power supply to the motor after the tip part of the movable contact passes through the second position until the opening operation is completed.

7. A gas insulated switchgear comprising the switch according to claim 1 as an earth switch.

8. A method for controlling a switch that includes:
a fixed contact;
a movable contact that is couplable to the fixed contact to complete a closing operation of the switch; and
a motor to drive the movable contact via a drive mechanism that converts rotational motion into linear motion of the movable contact,
the method comprising:
controlling the motor, during the closing operation of the switch, to rotate at a first rotation speed from start to completion of the closing operation; and
controlling the motor, during an opening operation of the switch, to rotate at a second rotation speed in a part of an entire moving range of the movable contact, the second rotation speed being lower than the first rotation speed, wherein
an interrupting point at which an arc current flowing between the movable contact and the fixed contact is extinguished is located in the part of the entire moving range,
a tip part of the movable contact is engaged with the fixed contact at start of the opening operation, and the controlling the motor during the opening operation of the switch includes:

controlling the motor such that the motor rotates at the first rotation speed from start of the opening operation until the tip part of the movable contact reaches a first position at which the tip part has just separated from the fixed contact;

controlling the motor such that the motor rotates at the second rotation speed after the tip part of the movable contact passes through the first position until the tip part reaches a second position, wherein the interrupting point is located between the first position and the second position, and wherein the part of the entire moving range of the movable contact is defined between the first position and the second position; and controlling the motor such that the motor rotates at a third rotation speed higher than the second rotation speed after the tip part of the movable contact passes through the second position until the opening operation is completed.

9. The method for controlling the switch according to claim 8, wherein the first rotation speed and the third rotation speed are equal to a rotation speed of the motor during the closing operation of the switch.

10. The method for controlling the switch according to claim 8, wherein the motor is one of an induction motor and a universal motor, the switch further includes:

a transformer to step down an input AC voltage; and a switching circuit to switch between direct connection of an AC power supply to the motor and connection of the AC power supply to the motor via the transformer, the controlling the motor such that the motor rotates at the first rotation speed includes controlling the switching circuit to directly connect the AC power supply to the motor, the controlling the motor such that the motor rotates at the second rotation speed includes controlling the switching circuit to connect the AC power supply to the motor via the transformer, and the controlling the motor such that the motor rotates at the third rotation speed includes controlling the switching circuit to directly connect the AC power supply to the motor.

11. The method for controlling the switch according to claim 8, wherein the motor is a universal motor, the switch further includes:

a resistor to divide a DC voltage that is input to the resistor; and a switching circuit to switch between direct connection of an DC power supply to the motor and connection of the DC power supply to the motor via the resistor, the controlling the motor such that the motor rotates at the first rotation speed includes controlling the switching circuit to directly connect the DC power supply to the motor, the controlling the motor such that the motor rotates at the second rotation speed includes controlling the switching circuit to connect the DC power supply to the motor via the resistor, and the controlling the motor such that the motor rotates at the third rotation speed includes controlling the switching circuit to directly connect the DC power supply to the motor.

* * * * *